April 14, 1953   G. W. CURTIS   2,634,663
TRACTOR
Filed Nov. 20, 1944   6 Sheets-Sheet 1

INVENTOR.
George W. Curtis
BY
Morsell & Morsell
ATTORNEYS.

April 14, 1953 G. W. CURTIS 2,634,663
TRACTOR
Filed Nov. 20, 1944 6 Sheets-Sheet 2
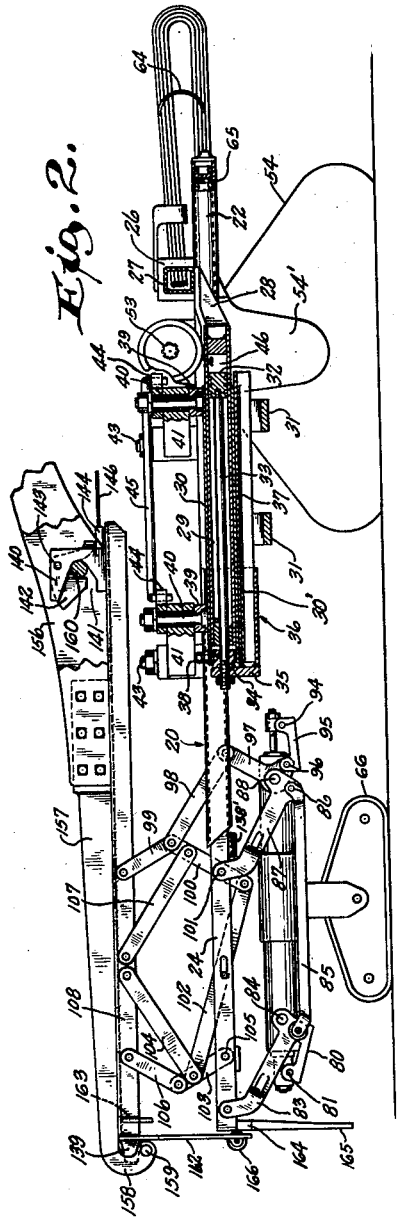
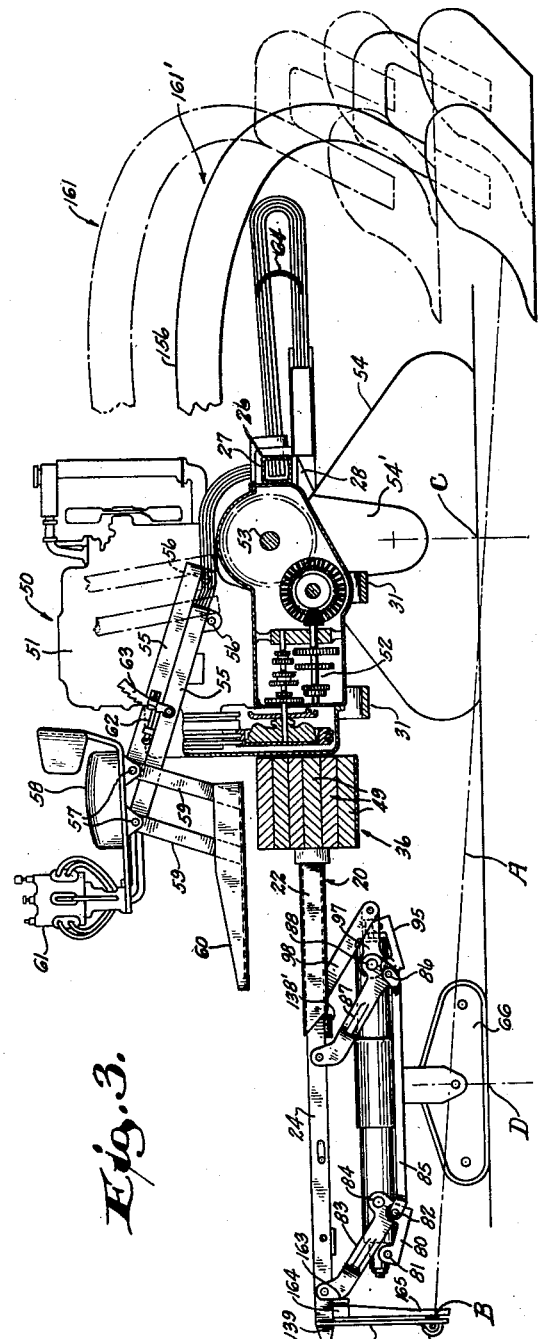
INVENTOR
George W. Curtis
By Morsell & Morsell
ATTORNEYS April 14, 1953     G. W. CURTIS     2,634,663
TRACTOR
Filed Nov. 20, 1944     6 Sheets-Sheet 3
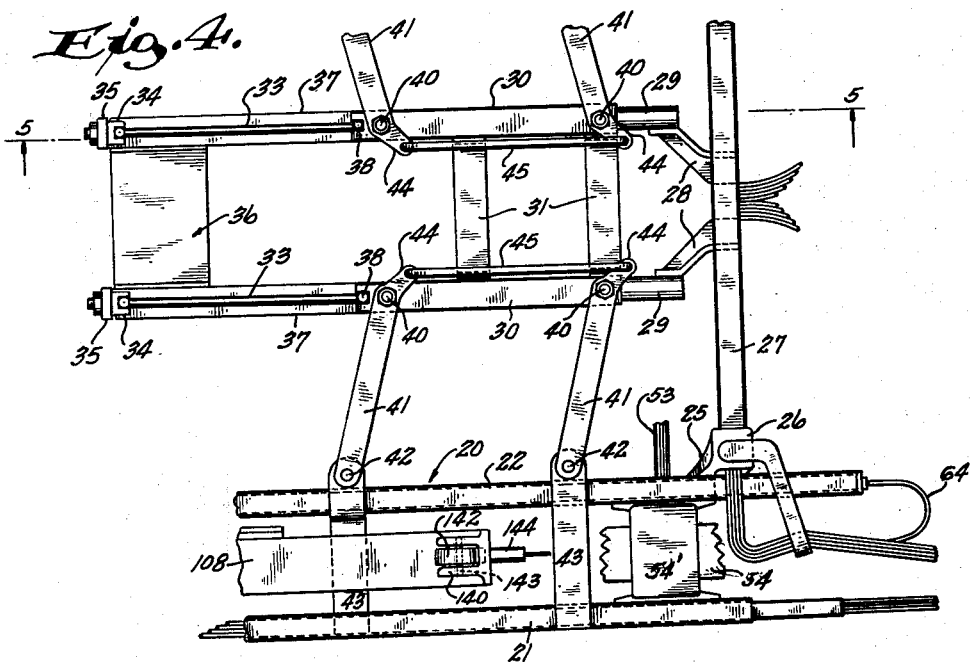
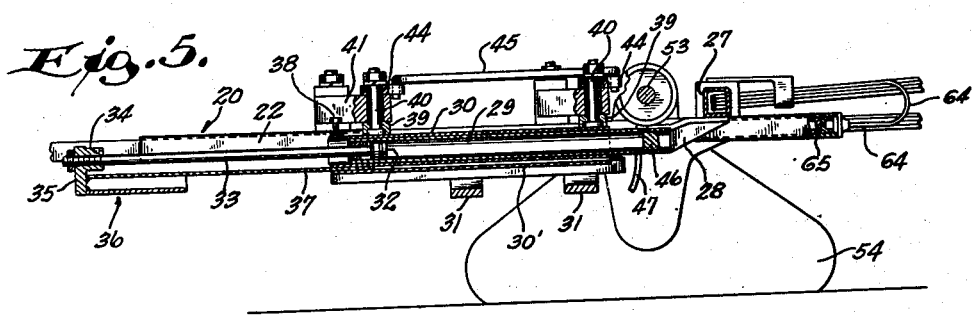
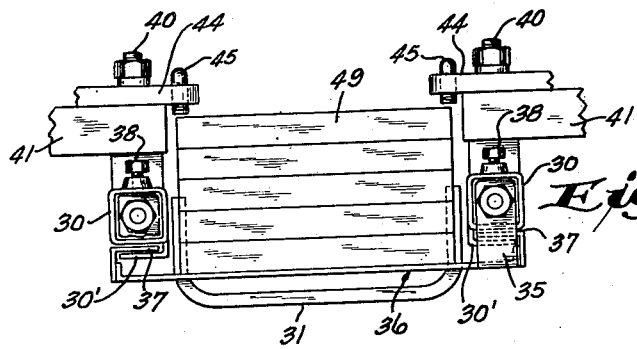
INVENTOR.
George W. Curtis
BY
ATTORNEYS.

April 14, 1953 G. W. CURTIS 2,634,663
TRACTOR

Filed Nov. 20, 1944 6 Sheets-Sheet 4

INVENTOR.
George W. Curtis
BY
Morsell & Morsell
ATTORNEYS.

April 14, 1953        G. W. CURTIS        2,634,663
TRACTOR
Filed Nov. 20, 1944        6 Sheets-Sheet 5
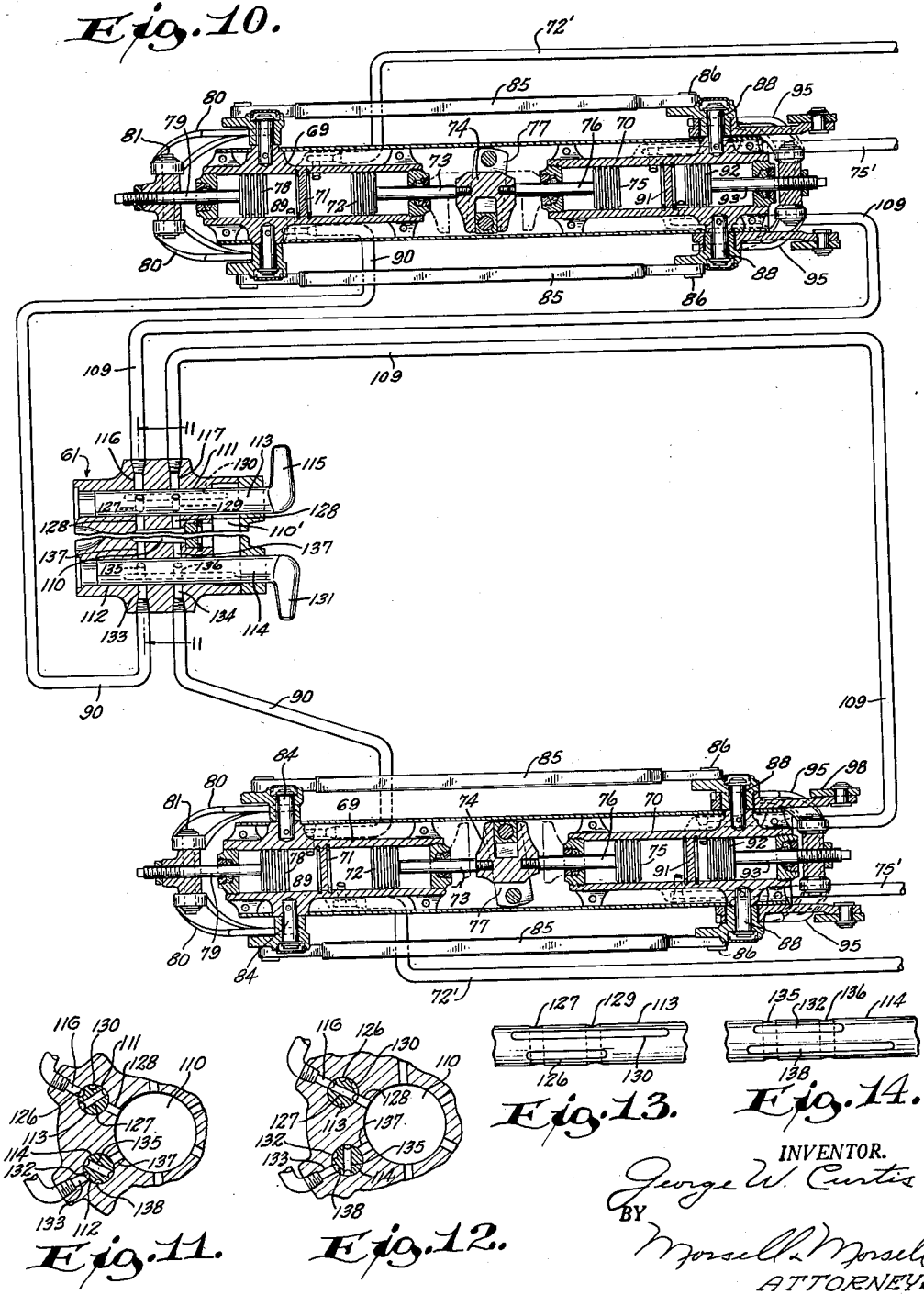

INVENTOR.
George W. Curtis
BY
Morsell & Morsell
ATTORNEYS.

Patented Apr. 14, 1953

2,634,663

UNITED STATES PATENT OFFICE 2,634,663

TRACTOR

George W. Curtis, Wauwatosa, Wis.

Application November 20, 1944, Serial No. 564,303

14 Claims. (Cl. 97—50)

This invention relates to improvements in tractors.

In the past it has been customary to attach relatively cumbersome and expensive wheeled implements of various types to a farm tractor and these wheeled implements have usually been connected at the rear. More recently some of the tractor manufacturers have manufactured a few implements which have no independent wheels and which can be mounted directly on the tractor. This development has reduced to some extent the implement cost but generally increased the amount of manual work required in assembling a tractor and a selected implement for a particular piece of work. The farmer still has the problem of manually moving a heavy implement into position, effecting a rigid connection to the tractor, and of adjusting the rear tread width of the tractor to suit the requiremens. This latter operation, with present methods, is very time consuming, as it involves jacking up the rear traction members, and moving or reversing the position of heavy wheels and tires. Those implements, now available, which are connectable directly to the rear of a tractor, are also objectionable from a number of other angles. In the first place, the implements are provided with a pivot connection for arcuate swinging movement in a vertical plane. This is undesirable, because in obtaining a required depth setting of the implement, the angle is changed as it is swung on the pivot, and this change in angle may detrimentally affect the work. Another objection to present day tractors is that they have a fixed center of gravity of weight. Because of this fact, they must be designed with this center of gravity far enough forward to prevent rearward overturning of the tractor under certain extreme conditions which are sometimes encountered, particularly when a plow is being pulled. In earlier tractors, where the center of gravity was not located far enough forward, serious accidents have occurred in which the tractor has turned over backwards, pinning the operator therebeneath. Where the center of gravity has been located far enough forward to minimize the possibility of accidents of this nature, there is necessarily parasitic weight on the front wheels or steering members, and this weight is a detriment during most of the work for which the tractor is used. The excess weight causes the front wheels to sink too deeply into soft soil, and causes too great a packing tendency.

It is a general object of the present invention to provide an all-purpose tractor which is so designed as to obviate the above-mentioned objectionable features of prior tractors.

A further object of the present invention is to provide an all-purpose tractor to which wheelless implements, for performing all of the necessary farming operations, as well as auxiliary wheelless bodies, may be quickly attached without manual labor. The design is such that the implements may be positioned either at the front or in the rear. Thus certain tools such as implements used in cultivating where good visibility of the work is an important factor, may be readily positioned at the front, and other implements such as plows, may be positioned at the rear.

A further object of the invention is to provide a tractor as above described having means near the front of the tractor to which drawbar extensions of a rear pulled implement may be attached, the said points of attachment being so located on the tractor that the line of draft resistance (which is an imaginary line drawn from the attachment point to the center of resistance of the implement) lies in an inclined plane which is so located as to minimize or entirely prevent overturning tendency when a rear implement such as a plow is being pulled. With the present invention means is provided whereby the plane of said line of draft may be made to pass below the center of ground contact of the rear traction members and above the center of ground contact of the front steering members, the said line extending from the rear and passing upwardly between said rear and front members to thus provide greater stability for the tractor. The additional effect of this situation is to favorably increase ground contact pressures, when plowing in hard ground, at a time when such increase is most needed, and the effect is also such that overturning tendencies are positively prevented.

A further object of the invention is to provide a tractor of the class described wherein the tread width at both the front and rear may be quickly and simultaneously altered to suit requirements, preferably by means under the control of an operator on the driver's seat.

A still further object of the invention is to provide a tractor having a frame of variable length, together with means for quickly altering the effective length to meet requirements. With this arrangement it is possible to extend the front portion of the frame a sufficient distance to accommodate and support a wagon body or wheelless combine directly on the tractor.

A further object of the invention is to provide a tractor of the class described, wherein there are four ground engaging members, the right hand front member being always in alinement with the right hand rear traction member, and the left hand front member being always in alinement with the left hand rear traction member. Thus the rear traction members run essentially in the same tracks as the front members. This arrangement has obvious advantages over a tractor design wherein there is a single front wheel, or two closely spaced front wheels, which run in a separate track intermediate the tracks made by the rear driving wheels.

A further object of the invention is to provide in a tractor of the class described means for exerting a uniform vertical lifting action on the attached implements as distinguished from an arcuate lifting action. Thus ideal tool performance at any required depth setting is insured.

A further and important object of the invention is to provide a tractor wherein normally only a small amount of the total weight of the tractor is carried on the front steering members and wherein there is means for readily shifting the center of gravity or weight to suit requirements for special purposes. Thus when plowing is being performed, with the plow attached at the rear, the weight may be shifted forwardly to counteract any overturning tendency. On the other hand, where a front cultivator is being used and where additional weight on the front steering members is undesirable, the weight may be shifted rearwardly to eliminate the possibility of overloading said steering members and to improve the weight distribution and improve the traction of the rear driving members. The arrangement may also be such that the total amount of weight may be reduced or increased as desired. As an important feature of the present invention, the shifting of the center of gravity may be accomplished either independently of or simultaneously with the reduction of the tread width.

A further object of the invention is to provide a construction in which a relative vertical movement of the front steering members with respect to the frame is permitted in order to compensate for any unevenness in the ground. The construction also provides for an automatic equalization of ground contact and soil shearing pressures.

A still further object is to provide a tractor of the class described wherein any or all of the abovementioned adjustments, such as the altering of the tread width, the changing of the effective frame length, the shifting of the center of gravity, or the raising and lowering of the implement platform, either during the process of attaching implements or after they have been attached, may be performed automatically under the control of an operator, without leaving the driver's seat, the said operations being preferably actuated by hydraulic ram mechanism.

The various features of the present invention make practical a more extensive application of the "mounted implement" principle. Thus in addition to providing the usual tractor-operated tillage implements, usually tractor attached, the present invention provides for attaching, transporting, and operating such additional farm equipment as wagons, manure spreaders, combine harvesters and corn pickers, the latter being furnished in the form of relatively inexpensive wheelless attachments. The present tractor is designed to slide under an implement or auxiliary body, lift the same in the matter of a lift truck, and effect automatic coupling without manual labor. The heaviest implement may, therefore, be picked up, coupled and transported to a desired location without requiring the operator to leave the driver's seat. The lifting mechanism to which the coupling members are attached is located in the front but is accessible from both the front and rear. Thus the same lift platform is employed for both front and rear mounted equipment. Where means is provided for attaching drawbar extensions of a rear implement to a front platform, a very favorable situation is obtained with respect to minimizing or entirely overcoming any overturning tendency of the tractor. The construction of the present invention provides greater flexibility in adapting the structure to different widths of row crops, provides wider maximum tread widths, narrower minimum tread widths, and the benefits of a four-wheeled type of design in a row crop type of tractor.

Thus the average farm, which comprises 60 to 80 tillable acres, may be served by a single tractor adapted to cooperate with a complete line of auxiliary equipment. Due to the fact that the auxiliary equipment is all wheelless, it may be obtained at a minimum of cost, and the farmer who heretofore could only afford a few of the most necessary implements can with the present invention obtain a complete line. In addition, due to the labor saving features of the present invention, the farm work may be performed with a material reduction in required man hours of work.

With the above and other objects in view, the invention consists of the improved tractor, and all its parts and combinations, as set forth in the claims, and all equivalents thereof.

In the accompanying drawings, illustrating one complete embodiment of the preferred form of the invention, in which the same reference numerals designate the same parts in all of the views, Fig. 1 is a plan view of the tractor frame with the power plant and driver's seat removed. The full line position of the parts indicates an arrangement having a maximum tread width and center of gravity shifted toward the rear, whereas the dot and dash lines indicate a minimum tread width with the center of gravity shifted in a forward direction;

Fig. 2 is a sectional view taken approximately on the line 2—2 of Fig. 1, the lift platforms being in elevated position and a fragment of a rear mounted implement being shown in attached position;

Fig. 3 is a sectional view taken on line 3—3 of Fig. 1 indicating the power plant and driver's platform in position;

Fig. 4 is a fragmentary plan view similar to Fig. 1, but showing the center of gravity shifted forwardly without effecting a change in the tread width;

Fig. 5 is a fragmentary sectional view taken on line 5—5 of Fig. 4;

Fig. 6 is a fragmentary front elevational view, on a larger scale, showing the front of the weight shifting mechanism;

Fig. 10 is a partially diagrammatic view, showing the front hydraulic units in horizontal section.

Fig. 11 is a sectional view taken approximately on the line 11—11 of Fig. 10;

Fig. 12 is a sectional view also taken approximately on the line 11—11 of Fig. 10 showing different positions of the valves;

Fig. 13 is a fragmentary side view of one of the valve members;

Fig. 14 is a fragmentary side view of another valve member;

The frame

Figure 1:
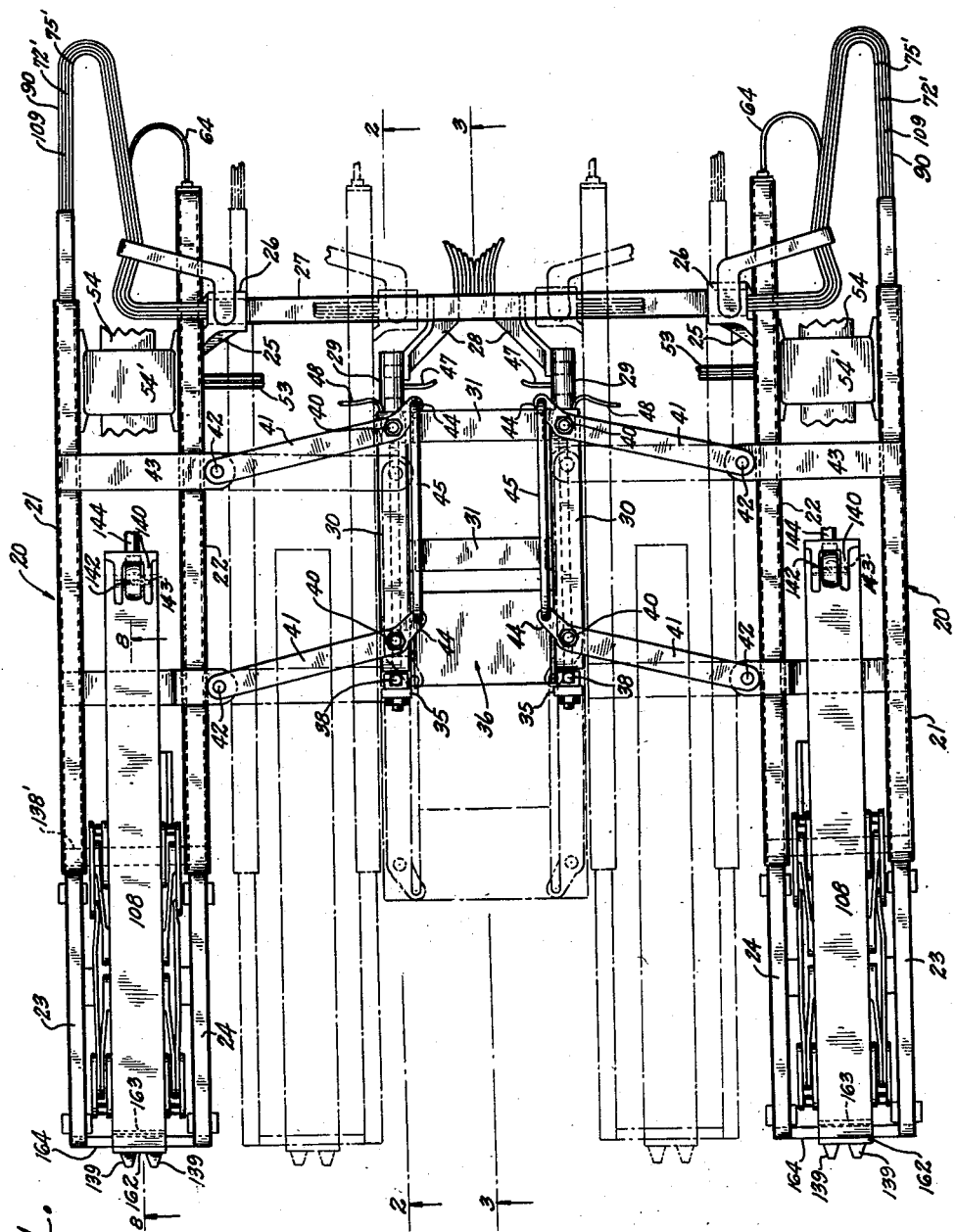
Figure 7:
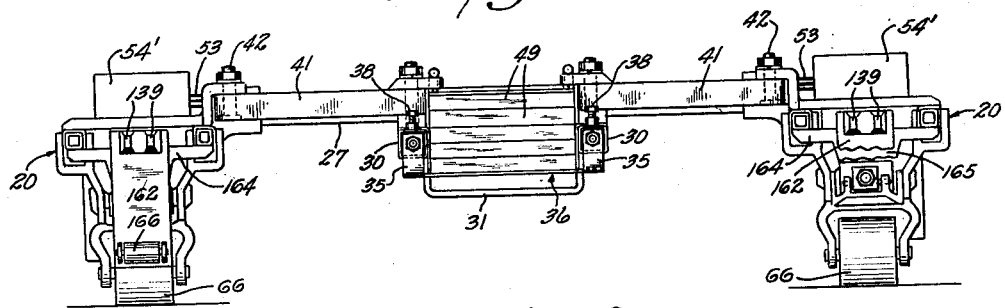
Fig. 7 is a front elevational view of the mechanism shown in Fig. 1.

Referring more particularly to Figs. 1, 2 and 3, the improved tractor includes a pair of longitudinally extending side frame assemblies 20. Each of the assemblies 20 includes spaced elongated tubular members 21 and 22 which are preferably square in cross section. Telescoped within the tubular members 21 and 22 are extension members 23 and 24. Projecting inwardly and upwardly from each of the members 22, near the rear of the frame, is a bracket 25 having its outer end in the form of a squared sleeve 26 for slidably receiving the end of a transverse tubular frame member 27. When the side frame assemblies 20 are moved from the full line position of Fig. 1 to the dot and dash line position therein, in a manner to be hereinafter described, the sleeves 26 will slide on the transverse member 27 from the full line position of Fig. 1 to the dot and dash line position therein. This will effect a change in tread width from the maximum shown by full lines to the minimum shown by dot and dash lines.

Brackets 28, which are connected to the transverse frame member 27 and which project forwardly therefrom, support the rear ends of hydraulic cylinders 29.

Weight shifting and tread width changing

Referring to Figs. 1 and 2, the cylinders 29 are telescopically received in tubular members 30 having guideway forming members 30' connected to their lower sides (see Fig. 6). The members 30 are connected by bottom strap members 31, and are preferably squared in cross section. A piston 32, movable in each cylinder 29, has a piston rod 33 connected thereto which projects from the forward end of the cylinder and extends through a block 34 and also through a lug 35 projecting upwardly from the forward end of a weight pan assembly 36. Extending rearwardly on each side of the weight pan assembly is a slide 37 which is movable in the adjacent guideway above the member 30'. The blocks 34 at each side of the front end of the weight pan assembly are adapted to be removably connected to the forward ends of the tubular members 30 by bolts 38.

Connected to the top of each tubular member 30 are bosses 39 which support the lower ends of pins 40. The inner ends of arms 41 are pivotally connected to the pins 40, and the outer ends of said arms are pivotally connected, as at 42, to the projecting ends of transverse members 43 on the side assemblies 20. Rigidly connected to the top of the inner end of each of the arms 41, and pivotal on the pins 40, is an extension 44. The extensions 44 on each side are connected by a rod 45 and the ends of the rods are pivoted to the ends of the extensions 44 to form and maintain a parallelogram arrangement on each side.

Hydraulic fluid admitted to the chambers 46 of the cylinders 29 from hydraulic conduits 47 (see Fig. 5) will cause the pistons 32 to be moved forwardly. If the bolts 38 are in the inserted position of Fig. 2, then the piston rods 33 will act to shift the weight pan 36 from the full line position of Fig. 1 to the dot and dash line position therein, and at the same time will shift the tubular members 30 in a forward direction. This will exert a pull in a forward direction on the inner ends of all of the swing arms 41 to move the latter from the full line position of Fig. 1 to the collapsed dot and dash line position therein. During such movement the swing arms will pull the side frame assemblies 20 inwardly to the dot and dash line position, with the sleeves 26 sliding inwardly on the transverse member 27. By reversing the flow of hydraulic fluid in the cylinders 29, that is by forcing fluid under pressure through the conduits 48 (see Fig. 1) which lead to the front ends of the cylinders, the pivots may be returned to the full line position of Fig. 1 or to any intermediate position thereof. The conduits 48 may extend forwardly in the corners of the squared tubes 30 against the outside of the cylinders 29.

If the bolts 38, which connect the weight pan assembly with the tubular members 30, are removed, then the weight pan assembly may be shifted forwardly, as shown in Figs. 4 and 5, without causing a shift of the side frame assemblies 20 or a change in the tread width.

While the assembly 36 may be attached to and operable to cause a shifting of the power plant, to thereby effect additional shifting in weight, it is preferred to keep the power plant stationary and to utilize auxiliary weights 49 in the weight pan which may be increased in number, decreased in number or entirely removed to suit various requirements.

The driving mechanism

Suitably supported on the transverse frame member 27 and on the rear drive shaft 53 is a power unit 50 (see Fig. 3) which includes an internal combustion engine 51 with clutch and transmission mechanism 52 for driving the rear drive shaft 53. The ends of the rear shaft 53 have a splined connection with rear traction units 54, and the latter members are connected to the side frame assemblies 20. The connection between the ends of the rear drive shaft 53 and the supporting housings 54' for the rear driving or traction units 54, as well as the construction of the driving and traction units, is the same as is illustrated and described in my pending application, Serial No. 554,193, filed September 15, 1944, now abandoned. While this type of endless traction member is much to be preferred, it is nevertheless obvious that driving wheels may be substituted therefor wherever this might be desirable.

With the arrangement above described, it is obvious that when the side frame assemblies 20 are moved inwardly and outwardly by the arms 41, that the rear traction units 54 will also be moved inwardly and outwardly and will slide on the splined connection between the ends of the rear drive shaft 53 and said traction units.

In order to provide a driver's seat and control unit which is so located as to afford maximum visibility under all operating conditions, it is preferred to have the driver's seat mounted as shown in Fig. 3. Referring to this figure, arms 55 are pivotally connected to the sides of the power unit, as at 56. The upper ends of the arms are connected to rock shafts 57 on the underside of the seat 58. Also connected to the rock shafts 57 and depending therefrom are legs 59 which support a platform 60. Suitably supported on the frame of the seat in a position in front of the operator is a control unit 61. For normal operation the seat will be disposed in the position of Fig. 3. However, if a relatively large wagon body or combine is being carried on the front of the tractor, then it is desirable to have the seat movable to a higher position so that the driver may see over the body. This may be accomplished by swinging the arms 55 upwardly toward a vertical position. As the arms swing upwardly, the dog 62 on each side will snap over the teeth of an arcuate rack 63 on each side, and will maintain the seat in any desired position of adjustment. Suitable yielding means may be employed to normally urge each dog into engagement with a tooth of the rack.

*The longitudinal frame adjustment.*

The innermost member 22 of each side frame assembly 20 has one end in the form of a hydraulic cylinder. Hydraulic fluid, delivered under pressure through the conduits 64, will act upon pistons 65 (see Fig. 2) connected to the rear ends of the extension frame members 24 to cause movement of the extension frames 23 and 24 in a forward direction. Thus the effective length of the frame may be materially increased to meet requirements. To return the frame members to telescoped position, it is merely necessary to reverse the control valve for the lines 64 and then drive the tractor forwardly against an obstruction in order to push the extension frames back into the normal position of Fig. 1.

*Front end platform lifting, equalizing and steering*

Figure 8:
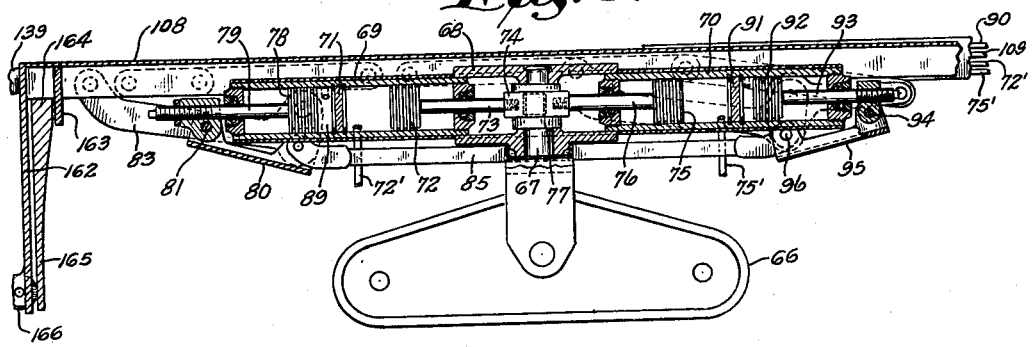
Fig. 8 is a fragmentary sectional view taken on line 8—8 of Fig. 1, the front ground engaging member, however, being shown diagrammatically without section. In this view the hydraulic equalizing mechanism is shown in fully collapsed position.
Figure 9:
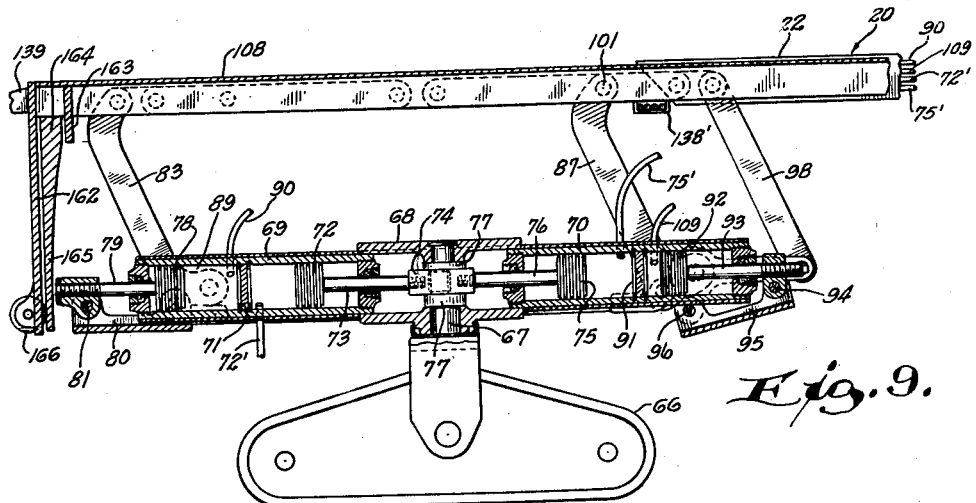
Fig. 9 is a view similar to Fig. 8, showing the hydraulic equalizing mechanism operating to project the front ground engaging member downwardly.

At the front end of the vehicle are two ground engaging steering units 66 which are preferably in the form of endless tracklaying members, as fully described in my co-pending application, Serial No. 554,193, filed September 15, 1944, now abandoned. Each unit is provided with an upwardly projecting trunnion 67 (see Figs. 8 and 9), and each trunnion is rotatable in a housing 68 thereabove. Connected to the forward end of each housing 68 is a cylinder 69, and connected to the rear end of each housing 68 is a cylinder 70. Each cylinder 69 has an intermediate partition 71. A piston 72 movable in the rear half of each cylinder 69, is connected by a piston rod 73 with a steering yoke 74 which operates a steering crank 77 connected to the trunnion 67. A second piston 75 in the forward part of each cylinder 70 is also connected by a piston rod 76 with the steering yoke 74. When hydraulic fluid, under control of the operator at the control unit 61, flows into the forward steering cylinder through the conduit 72′ on one side of the tractor, it will simultaneously flow through the conduit 75′ leading to the rear steering cylinder on the other side of the tractor. At the same time fluid will be exhausted from the front steering cylinder on the last-mentioned side through the conduit 72′ and from the rear steering cylinder on the first-mentioned side through the conduit 75′. This will cause steering of both front units 66 simultaneously in one direction. By reversing the flow of hydraulic fluid so that it is exhausted from those steering cylinders above mentioned which it entered and so that it enters those steering cylinders above mentioned from which it was exhausted, the piston 72 and 75 will be moved in a reverse direction and steering in the opposite direction will be affected.

On the forward side of the partition 71 in each cylinder 69 is another piston 78. This piston is suitably connected by a piston rod 79 to the ends of links 80, as at 81. The other ends of the links 80 are pivotally connected as at 82 to the lower ends of knee action members 83. The same ends of the knee action members 83 are pivotally connected to the sides of the cylinder 69, as at 84. Rods 85, on both sides of each cylinder have their forward ends pivotally connected to the pivots 82, and have their rearward ends pivotally connected, as at 86, to the lower ends of other knee action members 87. The same ends of the knee action members 87 are pivoted, as at 88, on pins projecting from the sides of the cylinder 70. The members 80, 83, 85 and 87 are duplicated on the two sides of each cylinder 69 and 70. Also there is identical mechanism on both sides of the tractor. Each chamber 89 is adapted to receive hydraulic fluid through a line 90 (see Fig. 10), and the line 90 communicates through the control valve mechanism with the corresponding mechanism on the other side of the tractor in a manner to provide a solid column of hydraulic fluid free to flow back and forth through the valve between the two when the pressure becomes greater on either unit 66 and thus compensate for unevenness in the ground over which the tractor is moving.

Each cylinder 70 has an intermediate partition 91, and on the rearward side of said partition, and movable in the cylinder, is a piston 92. The piston 92 is connected to a piston rod 93 and the outer end of the piston rod is pivotally connected, as at 94, with links 95. Each link 95 is pivotally connected, as at 96 (see Fig. 2), to one end of a bell crank lever 97. The bell crank levers 97 are pivotal on the pins 88. The other end of each bell crank lever is pivotally connected to one end of a link 98, and the other end of each link 98 is pivotally connected to links 99 and 100. Each link 100 is pivoted to the extension frames 23 and 24, as at 101, and below the pivot the links 100 are connected to links 102. The upper ends of the links 102 are pivotally connected to links 103 and 104. The lower ends of each link 103 are pivoted to the extension frame 23 and 24, as at 105, and the upper end of each link 103 is pivotally connected to the lower end of a link 106. Other links 107 have their lower ends pivotally connected to the links 100. The upper ends of the links 99, 107, 104 and 106 are pivotally connected to the lifting platforms 108. The links just described are duplicated on the two sides of the platform 108, as is clear from Fig. 1, and the entire mechanism is duplicated on both sides of the tractor.

As a result of this arrangement when hydraulic fluid is forced under pressure through the conduits 109 against the pistons 92, the piston rods 93 will through the linkage and levers just described cause movement of the two lifting platforms 108 from the collapsed position of Fig. 3 to the elevated position of Fig. 2 or to any intermediate position.

The hydraulic system

Referring now to Figs. 10, 11, 12, 13 and 14, the control unit 61, which is mounted near the driver's seat, includes a casing having a high pressure chamber 110 in which pressure is maintained by a suitable hydraulic pump and having bores 111 and 112 for receiving valve members 113 and 114. The valve member 113 has an operating handle 115 and is provided with an equalizing slot 126, which extends longitudinally of the valve member. This slot may be brought into registration with ducts 116 and 117 in the casing to connect the latter. The duct 116 is connected with the fluid conduit 109 leading to the cylinder 70 on one side of the tractor to operate the piston 92. The duct 117 communicates with the fluid conduit 109 leading to a like location on the other side of the tractor for operating the piston 92. When the valve member 113 is in the position of Fig. 11, the equalizing slot 126 connects the lines 109 with each other. When the valve member 113 is partially rotated, as in Fig. 12, to bring the transverse valve duct 127 into registration with the duct 116, it will, through one of the ducts 128, connect the fluid conduit 109 on one side with the fluid pressure chamber 110. At the same time another transverse port 129 in the valve member 113 will similarly connect the duct 117 with the fluid pressure chamber 110. Thus fluid under high pressure from the central chamber 110 will flow equally through both lines 109 to actuate the pistons 92 on the two sides of the tractor equally. This of course operates to move the platforms 108 simultaneously and equally toward the elevated position of Fig. 2. When the valve member 113 is in the position of Fig. 11, it will serve to hold the lift platforms in a selected elevated position. If the valve member 113 is rotated to bring the second longitudinal slot 130 into registration with the ducts 116 and 117, this slot being longer than the slot 126, then there is communication with a discharge or atmospheric pressure chamber 110'. When in this position, the weight of an implement on the platforms 108 will force the pistons 92 back to the position of Fig. 9 to return oil from the cylinders through the lines 109 into the oil chamber 110', which may connect with a suitable reservoir of the oil pump.

The manually operated valve member 114 may be rotated by means of the handle 131 to control the flow of hydraulic fluid to the equalizing cylinder bores 89 in the cylinders 69. The valve member 114 has a longitudinal slot 132 which is of sufficient length to connect the ports 133 and 134 leading to the hydraulic conduits 90. When the longitudinal slot 132 is in the position of Fig. 11, the fluid may flow without restriction from bore 89 on one side of the tractor to the other through the conduits 90, ports 133, 134 and slot 132, and thus the fluid pressure in the space 89 on one side may be equalized with the fluid pressure in the space 89 on the other side. When the valve member 114 is partially rotated to bring the transverse slots 135 and 136 into a position in which they connect the ports 133 and 134 with the ducts 137, then fluid under pressure from the high pressure chamber 110 may flow equally to the spaces 89 in the cylinders 69 to force the pistons 78 in an outward direction. This will operate on the links 80 and levers 83 and 87 to cause a relative downward movement of the steering unit 66 from a partially collapsed position or a fully collapsed position such as Fig. 2 or Fig. 8 toward the position of Fig. 9. When the valve is in the first-mentioned position, that is in a position in which the slot 132 registers with the ducts 133 and 134, then an automatic upward retraction of unit 66 on one side may take place simultaneously with the downward extension of unit 66 on the opposite side during operation over uneven ground which provides a vertical front steering member action similar to the knee action on an automotive vehicle. By turning valve 114 to a position of Fig. 12 where the long slot 138 connects the ducts 133 and 134 with the low pressure chamber 110', the units 66 on the two sides are permitted to collapse simultaneously by gravity.

Flexible conduits 90, 109, 72' and 75' extend from the front hydraulic assemblies to the control unit 61, so that there is no interference during relative movements of the parts. It is preferred to have these conduits extending into receiving boxes 138' and then longitudinally through the tubular frame members 23 and out of the rear end thereof, as shown in Fig. 1. These flexible conduits then extend into the tubular transverse frame member 27 and emerge from the center thereof from which position they can be readily connected to the control unit 61. The hydraulic conduits 64, which supply fluid for the longitudinal frame adjustment, also extend into the transverse tubular frame member 27 and emerge from the center thereof and then extend to the control unit 61. The hydraulic conduits 47 and 48 for operating the weight shifting and tread width changing mechanism may connect directly with the control unit.

Implement coupling

Figure 16:
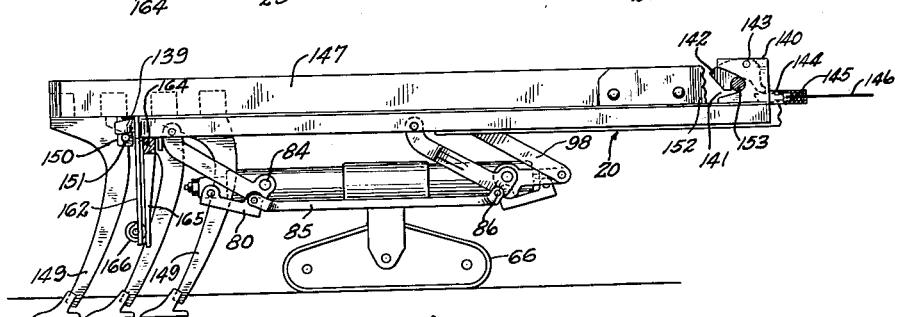
Fig. 16 is a sectional view taken on line 16—16 of Fig. 15.

Each of the lift platforms 108 has its front end formed with a pair of projecting lugs 139 (see Fig. 1). At the rear end of each platform, referring to Fig. 16, is a coupling member 140 having a front opening 141. A coupling dog 142 is pivoted to the member 140, as at 143, and is normally held yieldingly in coupling position by a suitable spring. The dog may be releasably locked in latching position by a sliding plunger 144, normally urged inwardly by a spring 145 and controlled by a wire or cord 146 leading to the driver's seat.

Figure 15:
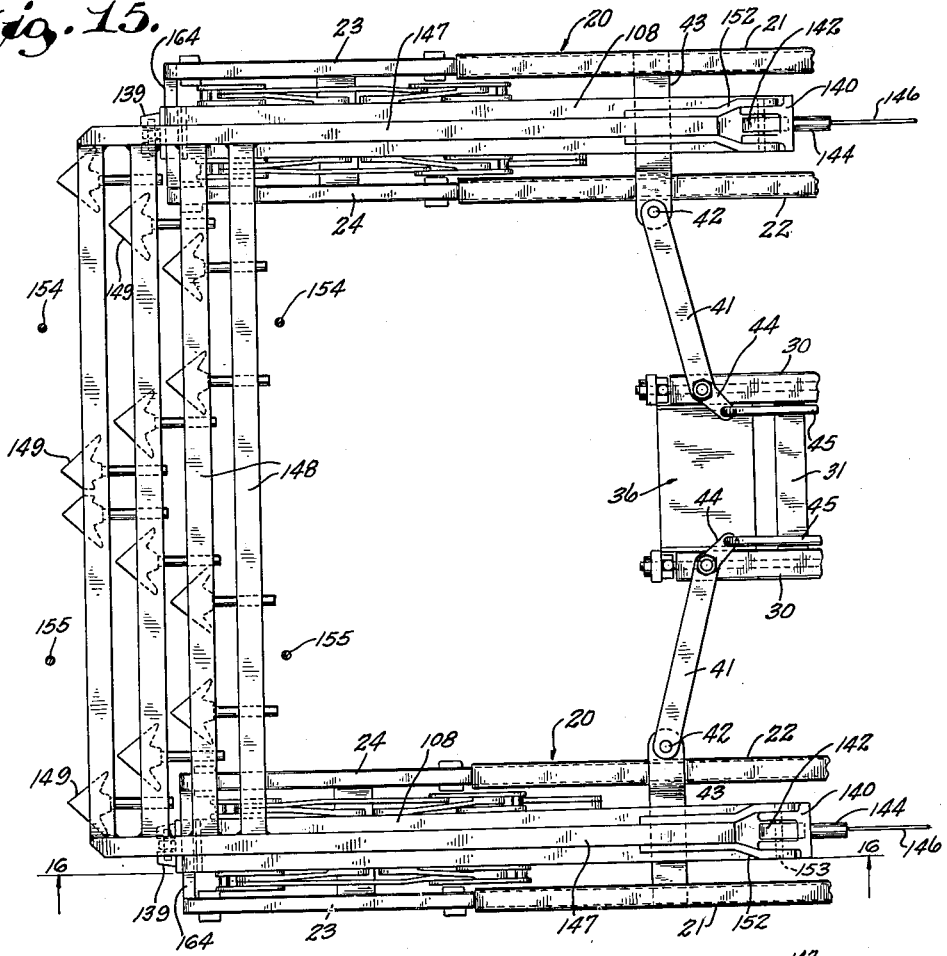
Fig. 15 is a fragmentary plan view of the front end of the tractor showing a front mounted cultivator attached thereto.

In Figs. 15 and 16 there is illustrated a front mounted cultivator which comprises side frame members 147 and front transverse members 148. The cultivating tools 149 project downwardly from the transverse members 148. Near the forward end of each of the side frame members 147 is a depending lug 150 having a pin 151 which projects from each side thereof. At the rear end of each side frame member 147 of the cultivator is a forked extension 152 with a transverse pin 153 (see Fig. 16).

With the cultivator supported on a suitable rack, the front end of the tractor may be driven forwardly underneath the cultivator, the tractor platforms 108 being positioned beneath the side frame portions 147 of the cultivator. The operator on the driver's seat of the tractor may then operate the handle 115 on the control unit to cause lifting of the platforms until they properly engage the lower sides of the cultivator side frames 14. Then by driving forwardly again a short distance, the front lugs 139 of the platforms will embrace the lugs 150 depending from the cultivator frame with the transverse pins 151 engaging beneath the platform lugs 139, as shown in Fig. 16. At the same time the rear pins 153 on the cultivator will contact the dogs 142 forcing the same upwardly until the pins snap into proper position, by reason of said spring tension, in the rear coupling members 140, as shown in Fig. 16. During this operation, plungers 144 are held in withdrawn position. The plunger cords 146 are then released to permit the plungers to move to the locking position of Fig. 16.

The lift platforms may then be elevated an additional distance to lift the cultivator off of its supporting rack. The tractor may then be driven away to a desired location in the field.

When cultivating is to be done, the platforms 108 are lowered to bring the cultivating tools 149 to a desired depth setting.

Referring to Figs. 2, 3, 7, 8 and 9, just behind the lugs 139 at the front of each lift platform 108 are transversely extending depending plates 162 and 163. These plates are spaced apart, as shown in Fig. 2. When the platforms are in the lowered position of Fig. 3, the plates embrace a transverse bar 164, connecting the front ends of the longitudinal side frame members 23 and 24, and said transverse bar has an integral depending bracket portion 165. The front plate 162 projects downwardly a substantial distance and is provided near its lower end with an opening in which a transverse contact roller 166 is mounted. Whether the platform is in the lowered position of Fig. 3 or in the raised position of Fig. 2, the roller 166 always engages the bracket 165 or bar 164 so that the pulling or pushing strains are transmitted from the implements through the platforms 108, plates 162, rollers 166, brackets 165 to the frame members 23—24 and in turn to the relatively strong side frame assemblies 20.

During use the drawbar resistance of an implement is transmitted to the frames 108 through the couplings 139 and 140. If no other means were provided, this drawbar resistance would be transmitted to the frames 23 and 24 through the arms 95, 97 to 100, 102 to 104, 106 and 107. These arms, however, are preferably made of relatively light gauge and yieldable material and are not intended to withstand the full stresses that the drawbar resistance would exert thereon. In addition, the pivotal connections of said arms have a certain amount of necessary play which would be undesirable in a draft transmitting connection but which is necessary for smooth elevating operation.

In order to prevent the elevating linkage from having any substantial horizontal drawbar stresses exerted thereon, the rigid plates 162 having rollers 166 which are in constant thrust contact with the rigid plates 165 are provided to transmit substantially all horizontal drawbar stresses between the platforms 108 and the frames 23 and 24.

The platforms 108 are intended to operate at the lowest possible position permitted by the implement attached thereto. For example, the plow shown in Fig. 3 is so designed that when it is in its deepest plowing condition the platforms 108 may be disposed in their lowermost position, as shown in Fig. 3. Since the rollers 166 transmit the major share of the horizontal drawbar resistance to the plate 165 at the point B when the platforms 108 are disposed as shown in Fig. 3, the weighted tractive effect or drawbar line effect necessarily approaches the plane of the line AB which extends below the point C under the deepest plowing condition. The actual line of drawbar resistance will vary with the location of the implement and of the platforms 108; however, it is intended that the implements creating the heaviest drawbar loads be designed so that the platforms 108 and the rollers 166 may be positioned in their lowermost positions shown in Fig. 3 during use therewith, in order to bring the drawbar line to a point below the point C when the heaviest loads are being pulled.

It is an important feature of the present invention that when a rear plow is being pulled, as at 161, Fig. 3, that the line of draft resistance may be so located as to minimize or entirely prevent any overturning tendency. With the present invention the effective attachment point, for the purpose of determining the line of draft resistance A is intended to approximate the point B (Fig. 3) where the roller contacts the bracket 165. The plane of the line of draft resistance passes from the tool at an incline upwardly, below the center of ground contact C of the rear traction members and above the center of ground contact D of the front steering members. With the plane of the line of draft resistance, extending as indicated at A, and below the point C, any overturning tendency is reduced to a minimum. Also, by having the plane indicated at A pass below the point C, ground contact pressures are favorably increased when most needed. This increase in ground contact pressures takes place automatically. For example, when plowing in hard ground, the ground contact pressures are increased in proportion to the resistance encountered by the plow. Furthermore, no matter how much resistance is encountered by the plow, or no matter what type of incline the tractor is operating on, overturning tendencies are substantially prevented because of the location of the line of draft resistance.

Referring to Fig. 15, one row of planted corn or other crop is designated at 154 and another row at 155. The cultivating tools 149 are so arranged that they will cultivate between the two rows and on the outside of both row 154 and row 155. The front steering members and the rear traction members are of course in alinement and will operate between the rows. Prior to starting the cultivating operation, the side frame assemblies 20 of the tractor may be moved inwardly or outwardly to suit requirements and to fit the particular implement. In addition, the center of gravity may be shifted by moving weight pan 36 and weights 49 to the rear or full line position of Fig. 1. This is desirable during cultivating with a front mounted implement, because additional weight on the front steering member 66 is undesirable during this type of operation.

All of the other mounted implements may be furnished and equipped with lugs 150 and transverse pins 151, as well as with rear coupling pins 153 which are positioned to cooperate with the coupling members on the platforms 108.

Where it is desired to carry a wheelless wagon body or a combine harvester on the front of the tractor, the longitudinal extension frame members 23 and 24 may be moved forwardly to increase the effective length of the tractor and at the same time the main side frames 20 may be positioned to provide any tread width desired between the minimum and maximum to obtain proper sidewise stability for the particular load conditions involved. These special bodies may then be coupled in the same manner as heretofore described in connection with the cultivator.

By having provision for mounting implements at the front, perfect visibility is insured. This is particularly important in cultivating so that the operator can see that the cultivator is operating in a proper position between the rows. When relatively large bodies are mounted on the front, then it is desirable to raise the driver's seat 58 in the manner heretofore described, so that the driver can see over the body.

Referring now to Fig. 2, implements doing work at the rear, such as plows, may be coupled to the same lift platforms 108. Each rear implement, such as the plow, is provided with a pair of spaced draw bar members 156, each having an extension 157. The front end of each extension is hooked downwardly, as at 158, and provided with a transverse pin 159 which is engageable beneath the spaced front lugs 139 of the lift platforms, as shown. Each of the draw bar portions 156 is bifurcated, as shown in Fig. 2, with a transverse pin 160 extending between the bifurcations.

With the plow or other rear connected implements supported on a suitable rack, the tractor may be backed into position until the draw bar portions 157 are over the lift platforms 108. The tractor is originally backed a little farther inwardly than the final position, and after the platforms have been adjusted to the proper height, it is driven forwardly to cause engagement of the pins 159 beneath the lugs 139, and of the pins 160 with the coupling members 140.

In Fig. 2 the lift platforms 108 are shown with the plow in elevated position to clear the ground.

In Fig. 3 the dot and dash lines 161 indicate an elevated or carrying position of the plow, and the full line position 161' indicates a tilling position. It is apparent that with both front and rear mounted implements, that due to the straight vertical movement of the platforms 108 and the rigid connection of the implements thereto, the implements may be raised or lowered in straight up and down directions. Thus ideal tool operating positions may be obtained at any of the various depth settings. With present day implements, which are attached by swinging connections to the tractor, each time the depth setting is changed, the angularity of the tool in the ground is also changed which is a marked disadvantage.

It is apparent from the above that an all-purpose tractor has been provided to which wheelless implements for performing all of the necessary farming operations, as well as auxiliary wheelless bodies may be quickly attached without manual labor while the operator is in the driver's seat. It is also apparent that through the novel hydraulic controls, the driver may quickly adjust the effective length of the tractor, the wheel tread width, and the center of gravity to meet the requirements of a particular piece of work. During use the front steering members 66 will always be in alinement with the rear traction members 54 so that only two tracks are made in the soil. By utilizing the improved tracklaying units of my pending application, Serial No. 554,193, in conjunction with a tractor of this design, heavy loads may be carried with comparatively low, automatically equalized, ground contact pressures, thus providing low soil shearing stresses and a high ratio of tractive effort per unit of tractor weight. The design also permits the carrying of a considerably greater proportion of the total tractor weight on the driving members when this is desirable. Thus improved driving traction is obtained, and the possibility of the tractor turning over in use is minimized. The total amount of weight carried in the weight pan may be increased or decreased, as desired, and this weight may be shifted forwardly or rearwardly, either simultaneously or independently of the adjustment of the tread width to meet particular requirements. During use of the device, automatic equalization of ground contact and soil shearing pressures is provided due to the novel knee action of the knee members 83 and 87. In addition, the front steering units may be simultaneously raised or lowered, relative to the frame, and under the control of the operator whenever this may be required for special conditions.

Reference is also made herein to my pending application, Serial No. 477,559, filed March 1, 1943, now Patent No. 2,416,679, wherein there is disclosed a tracklaying unit. In this application features of the tread width adjustment are disclosed but not claimed.

Various changes and modifications may be made without departing from the spirit of the invention and all of such changes are contemplated as may come within the scope of the claims.

What I claim is:

1. An agricultural device comprising: a ground engaging implement having an elongated connection member forming a drawbar for the implement, a tractor having a frame, a horizontally disposed platform, elevating means positioned to movably connect said platform to said frame for movement above said frame in such a manner that all portions of the platform are moved substantially the same distance when said elevating means is operated, means for operating said elevating means to raise or lower the platform, said elongated implement connection member being positioned on top of said platform while the ground engaging implement is at one end of the tractor frame, and complementary means on said elongated portion of the connection member and platform positioned to detachably connect said member on top of said platform.

2. In a tractor having a frame, horizontally disposed platform structure having an upper surface, elevating mechanism positioned to movably connect said platform structure to said frame for vertical movement above said frame, implement couplings on the upper surface of said platform structure above said frame, means for operating said elevating means to control the vertical position of said platform structure, a depending plate rigidly connected to the platform structure above said frame and having a portion extending below said frame, a depending bracket on the tractor frame adjacent and parallel to said plate, and contact means operable in any position of adjustment of said platform structure for transmitting draft resistance from said plate to a part of said bracket located below said frame and platform.

3. In a tractor having a frame, horizontally disposed platform structure having an upper surface, elevating mechanism positioned to movably connect said platform structure to said frame for vertical movement above said frame, implement couplings on the upper surface of said platform above said frame, means for operating said elevating means to control the vertical position of said platform structure, a depending plate rigidly connected to the platform structure above said frame and having a portion extending below said frame, a depending bracket on the tractor frame adjacent and parallel to said plate, and a roller on said plate contacting said bracket and positioned to engage the bracket below said frame in any position of adjustment of said platform structure.

4. In a tractor having a longitudinally extending frame portion, an extension frame connected to said frame portion for extensible movement, power means for causing extensible movement of said extension frame, a horizontally disposed platform structure, elevating means positioned to movably connect said platform structure to said extension frame for vertical movement above said frame, implement coupling members on said platform structure, traction means supporting said frame portion, and ground engaging means supporting said extension frame.

5. In a tractor having spaced longitudinally extending frame portions, an extension frame connected to each frame portion for extensible movement, fluid pressure mechanism for causing extensible movement of said extension frames, a horizontally disposed platform for each extension frame, elevating means positioned to movably connect each platform to its extension frame for vertical movement above said extension frame, implement coupling members on said platforms, traction means supporting said spaced frame portions, and a ground engaging member supporting each extension frame.

6. In a tractor having a prime mover, a frame portion supporting said prime mover, spaced frame portions laterally adjustably connected to said first mentioned frame portion, a vertically movable coupling member on each of said spaced frame portions, fluid pressure operated mechanism for laterally moving said spaced frame portions to adapt the spacing between said coupling members thereon to particular requirements, and ground engaging means supporting said spaced frame portions.

7. In a tractor having a prime mover, a frame portion supporting said prime mover, spaced longitudinally extending side members laterally adjustably connected to said frame portion, an extension member connected to each side member for extensible movement, fluid pressure operated mechanism for causing extensible movement of said extension members, a vertically movable coupling on each extension member, ground engaging means supporting said spaced side members, ground engaging means supporting each extension member, and fluid pressure operated mechanism for laterally adjusting said spaced side members to adapt the spacing between the coupling members to particular requirements.

8. In a tractor having a prime mover, a frame portion supporting said prime mover, spaced longitudinally extending side members laterally adjustably connected to said frame portion, an extension member connected to each side member for extensible movement, fluid pressure operated mechanism for causing extensible movement of said extension members, a horizontally disposed platform for each extension member, elevating means positioned to movably connect each of said platforms to its extension member for vertical movement above said extension member, a coupling on each platform, ground engaging means supporting said side members, ground engaging means supporting each extension member, mechanism for operating said elevating means to raise or lower the platforms and the coupling members thereon, and fluid pressure operated mechanism for laterally adjusting said spaced side members to adapt the spacing between the coupling members to particular requirements.

9. In a tractor having a frame, horizontally disposed platform structure; elevating means disposed to movably connect said platform structure to said frame at the front thereof for vertical movement of said platform above said frame; implement couplings on said platform structure above said frame; means for operating said elevating means to control the position of said platform structure; a depending plate rigidly connected to the front end of the platform structure above said frame and having a portion extending below said frame; a depending bracket fixed to the front end of the tractor frame behind said plate; and means operable in any position of adjustment of said platform for transmitting draft resistance from said plate to a part of said bracket located below said frame and said platform.

10. In a tractor having a frame, horizontally disposed platform structure; elevating means disposed to movably connect said platform structure to said frame at the front thereof for vertical movement of said platform above said frame; implement couplings on said platform structure above said frame; means for operating said elevating means to control the position of said platform structure; a depending plate rigidly connected to the front end of the platform structure above said frame and having a portion extending below said frame; a depending bracket fixed to the front end of the tractor frame behind said plate; and contact means near the lower end of said plate for transmitting draft resistance to said bracket at a location substantially below the tractor frame when the platform structure is in lowered position.

11. In a tractor having a main frame, having a prime mover, and having ground engaging traction means, an auxiliary frame connected to said main frame for movement laterally thereof; elevating linkage connected to said auxiliary frame; implement couplings connected to said elevating linkage for vertical movement above said auxiliary frame; fluid pressure operated mechanism for moving said auxiliary frame laterally relative to said power unit; and power means for operating said elevating linkage, whereby said couplings may be moved to a selected vertical and lateral position in accordance with requirements.

12. In a tractor having a frame, having a prime mover, and having ground engaging traction means, said frame having a longitudinally extensible portion; elevating linkage connected to the extensible portion of said frame; implement coupling means connected to said elevating means for vertical movement above said frame; fluid pressure operated mechanism for causing extensible movement of said extensible frame portion; and power means for operating said elevating linkage, whereby said coupling means may be moved to a selected vertical and longitudinal position in accordance with requirements.

13. In a tractor having a main frame, having a prime mover, and having ground engaging traction means, an auxiliary frame connected to said main frame, said auxiliary frame having a longitudinally extensible portion and being connected to said main frame for movement laterally thereof, elevating linkage connected to the extensible portion of said auxiliary frame; implement couplings connected to said elevating linkage for vertical movement above said frame; fluid pressure operated mechanism for moving said auxiliary frame laterally relative to said main frame; fluid pressure operated mechanism for causing extensible movement of said auxiliary fluid frame; and pressure operated mechanism for operating said elevating linkage, whereby said couplings may be moved to a selected longitudinal, lateral and vertical position in accordance with requirements.

14. An agricultural device comprising a ground engaging implement having an elongated drawbar; a tractor having a frame; a horizontally disposed longitudinally extending elongated platform above said frame; elevating means at the forward end of said frame positioned to movably connect said platform to said frame for vertical movement above said frame; power operated mechanism for actuating said elevating means to raise or lower the platform; said elongated implement drawbar being positioned longitudinally on top of said platform, and projecting rearwardly with said ground engaging implement at the rear of the tractor frame; and longitudinally spaced sets of complementary coupling members on said drawbar and on said platform positioned to detachably connect the drawbar on top of said platform.

GEORGE W. CURTIS.

References Cited in the file of this patent

UNITED STATES PATENTS

| Number | Name | Date |
|---|---|---|
| 529,495 | Jackson | Nov. 20, 1894 |
| 1,259,638 | Knudsen | Mar. 19, 1918 |
| 1,277,434 | Leadbeater | Sept. 3, 1918 |
| 1,284,262 | Druessel | Nov. 12, 1918 |
| 1,323,890 | Manly | Dec. 2, 1919 |
| 1,384,944 | Flood | July 19, 1921 |
| 1,398,859 | Hurtig | Nov. 29, 1921 |
| 1,419,014 | Burtnett | June 6, 1922 |
| 1,419,160 | McKinnon | June 13, 1922 |
| 1,538,167 | Chappell et al. | May 19, 1925 |
| 1,783,293 | King et al. | Dec. 2, 1930 |
| 1,808,759 | Bickerton | June 9, 1931 |
| 1,937,839 | Parrett | Dec. 5, 1933 |
| 1,967,283 | Brown | July 24, 1934 |
| 2,002,002 | Brown et al. | May 21, 1935 |
| 2,278,081 | Kramer | Mar. 31, 1942 |
| 2,310,930 | Blanchett | Feb. 16, 1943 |
| 2,314,041 | Gurries | Mar. 16, 1943 |
| 2,354,084 | Geraldson | July 18, 1944 |
| 2,365,387 | Briscoe | Dec. 19, 1944 |
| 2,412,158 | Kuehlman et al. | Dec. 3, 1946 |

FOREIGN PATENTS

| Number | Country | Date |
|---|---|---|
| 514,384 | France | Nov. 15, 1920 |
| 120,586 | Great Britain | Nov. 21, 1918 |
| 112,689 | Sweden | Dec. 12, 1944 |